United States Patent Office 3,387,010
Patented June 4, 1968

3,387,010
METAL OXIME COMPOUNDS
Kailash Chandra Pande, Adrian, Mich., assignor to Stauffer Chemical Company, New York, N.Y., a corporation of Delaware
No Drawing. Filed Dec. 27, 1965, Ser. No. 516,755
5 Claims. (Cl. 260—429.5)

This invention relates to new metal-organic compounds and more particularly concerns metal oximes of the formula:

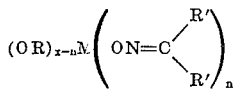

where R is a 1–6 carbon atom aliphatic group which may be halo- or cyano-substituted, an aromatic group or a halo- or cyano-substituted aromatic group, R' is hydrogen or a member of any of the foregoing groups, M is aluminum or titanium, $n$ is an integer from 1 to 3 when M is aluminum and from 1 to 4 when M is titanium, and $x$ is 3 when M is aluminum and 4 when M is titanium.

The compounds of the invention have utility as endblockers in silicone chemistry and are also useful as polymerization and organic reaction catalyst. They are best prepared by reacting the corresponding metal alkoxides with ketoximes or aldoximes comprising the desired R' groups which may be the same or different:

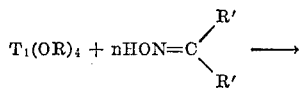

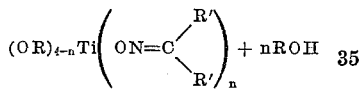

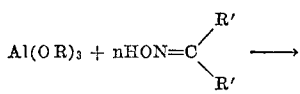

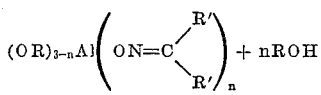

The reaction is best carried out in the substantial absence of moisture. Although use of a solvent is not essential, the reaction is facilitated if one is employed. Heptane, benzene or toluene is generally used. The reaction temperature is advisedly kept within the range 80–100° C. In the presence of a suitable amount of solvent, the reaction may be allowed to proceed at refluxing temperatures.

The aluminum compounds herein can also be prepared by reacting a solvent solution of a trialkyl aluminum with a stochiometric amount of ketoxime under essentially the same conditions:

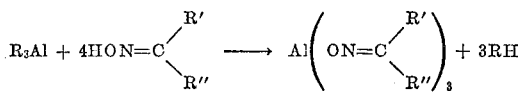

The invention is further illustrated by the following examples which are not to be taken in any way limitative thereof.

Example I

Titanium tetraisopropoxide (28.4 grams) was dissolved in benzene (250 ml.). To this solution was added 29.2 grams of acetoxime (molar ratio 1:4). The reaction mixture was refluxed, the isopropanol-benzene azeotrope (B.P. 71°) being continuously fractionated off. This operation required about 7 hours.

After the remaining solvent was distilled off, the last traces of volatiles were removed by maintaining the reaction mixture at 60° and 0.1 mm. pressure for about 1 hour. A white solid was obtained which by I.R. and N.M.R. was proved to be

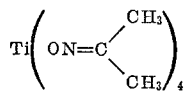

Example II

To a solution of titanium isopropoxide (28.4 grams) in benzene (250 ml.) were added 21.9 grams acetoxime (molar ratio 1:3). The reaction mixture was refluxed and the isopropanolbenzene azeotrope was slowly fractionated out, whereafter excess benzene was distilled off. After evaporating residual volatiles, a white solid was obtained. This was soluble in benzene and analysis showed it to be

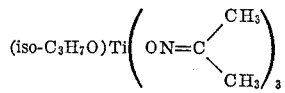

Example III 14.6 grams acetoxime were added to a solution of titanium isopropoxide (28.4 grams) in benzene (250 ml.). After working up as above the solid product proved to be

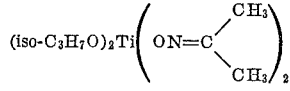

Example IV

Titanium isopropoxide and acetoxime in the molar ratio of 1:1 were refluxed in benzene and the volatile fractions thereafter removed under reduced pressure. A solid was obtained which was shown by analysis to be

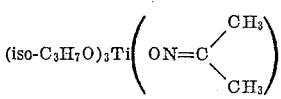

Example V

Aluminum isopropoxide (20.4 grams) was dissolved in benzene (200 ml.). To this was added 26.9 grams acetoxime (molar ratio 3:8). The reaction mixture was refluxed and the alcoholbenzene azeotrope was fractionated out. After all the azeotrope was removed (ca. 8 hours), a solid was formed. This was filtered and washed with dry benzene. Analysis showed it to be

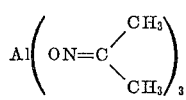

Example VI

A mixture of aluminum isopropoxide and acetoxime in the molar ratio of 1:2 was refluxed in dry benzene and the reaction mixture thereafter worked up as above. The solid end product was found by analysis to be

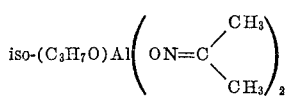

B.P. 190–200°/0.01 mm. Hg.

Example VII 7.3 grams acetoxime and 20.4 grams aluminum isoproxide (molar ratio 1:1) were allowed to react in 200 ml.

benzene. After working up, a viscous liquid was obtained. B.P. 140–145°/0.05 mm. Hg. Analysis corresponds with the structure

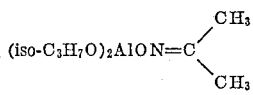

Example VIII

Triethylaluminum (1.14 grams) in dry toluene was allowed to react with acetoxime (2.28). Ethane gas evolved and a precipitate was formed. The precipitate was filtered, washed with more toluene and analyzed. It corresponded to the structure of the product compound in Example V.

What is claimed is:

1. A compound conforming to the formula:

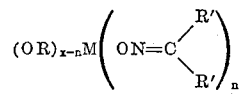

where R is from the class consisting of aliphatic radicals containing 1–6 carbon atoms, aromatic radicals and such hydrocarbon radicals when halo- or cyano-substituted, R' is hydrogen or a member of said class, M is from the group consisting of aluminum, and titanium, $n$ is an integer from 1 to 3 when M is aluminum and from 1 to 4 when M is titanium, and $x$ is 3 when M is aluminum and 4 when M is titanium.

2. A compound conforming to claim 1 when $x-n=0$.
3. A compound conforming to claim 1 in which (OR) is isopropoxy.
4. A compound conforming to claim 1 when R' is methyl.
5. A compound conforming to claim 4 when (OR) is isopropoxy.

References Cited

UNITED STATES PATENTS 2,011,292   8/1935   Koch.
3,053,871   9/1962   Aries.
3,056,820   10/1962  Martinek.

TOBIAS E. LEVOW, *Primary Examiner.*

H. M. S. SNEED, *Assistant Examiner.*

UNITED STATES PATENT OFFICE
CERTIFICATE OF CORRECTION

Patent No. 3,387,010　　　　　　　　　　　　　　　　June 4, 1968

Kailash Chandra Pande

It is certified that error appears in the above identified patent and that said Letters Patent are hereby corrected as shown below:

Column 1, in the equation appearing below line 57, the numeral "4" should read -- 3 --.

Signed and sealed this 9th day of December 1969.

(SEAL)
Attest:

Edward M. Fletcher, Jr.　　　　　　　　　　WILLIAM E. SCHUYLER, JR.
Attesting Officer　　　　　　　　　　　　　　Commissioner of Patents